United States Patent
Kurz et al.

(10) Patent No.: US 11,458,780 B2
(45) Date of Patent: Oct. 4, 2022

(54) TIRE COMPONENT FOR A GREEN TIRE

(71) Applicant: Continental Reifen Deutschland GmbH, Hannover (DE)

(72) Inventors: Martin Kurz, Hannover (DE); Danny Giehrisch, Hannover (DE); Tobias Ehmke, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 154 days.

(21) Appl. No.: 16/960,058

(22) PCT Filed: Oct. 16, 2018

(86) PCT No.: PCT/EP2018/078137
§ 371 (c)(1),
(2) Date: Jul. 3, 2020

(87) PCT Pub. No.: WO2019/134766
PCT Pub. Date: Jul. 11, 2019

(65) Prior Publication Data
US 2021/0053401 A1    Feb. 25, 2021

(30) Foreign Application Priority Data
Jan. 5, 2018    (DE) .................... 10 2018 200 103.0

(51) Int. Cl.
*B60C 23/04*    (2006.01)
*B60C 13/00*    (2006.01)
(Continued)

(52) U.S. Cl.
CPC ........ *B60C 23/0452* (2013.01); *B60C 13/001* (2013.01); *H01Q 1/2241* (2013.01); *B60C 2015/044* (2013.01)

(58) Field of Classification Search
CPC .............. B60C 23/0452; B60C 13/001; B60C 2015/044; B60C 23/0433; B60C 23/0408; B60C 23/0447; H01Q 1/2241
(Continued)

(56) References Cited

U.S. PATENT DOCUMENTS

| 5,218,861 | A | * | 6/1993 | Brown ............. G06K 19/07779 |
| | | | | 340/448 |
| 6,087,930 | A | | 7/2000 | Kulka et al. |
| | | | | (Continued) |

FOREIGN PATENT DOCUMENTS

| CN | 1141613 A | 1/1997 |
| CN | 1980803 A | 6/2007 |

(Continued)

OTHER PUBLICATIONS

Part of counterpart application CN office action dated Nov. 3, 2021 of application No. 2018800851679 (PCT/EP2018/078137).
(Continued)

*Primary Examiner* — Eric Blount
(74) *Attorney, Agent, or Firm* — Gregory Adams; David L. Cate

(57) ABSTRACT

The invention is based on a tire component (1) for a green tire (6), a rubber region (2) of the tire component (1) being made of rubber, at least one transmitting and receiving device (3) being arranged in the rubber region (2), the at least one transmitting and receiving device (3) being an electromagnetically acting transmitting and receiving device (3) and the at least one transmitting and receiving device (3) having at least one antenna (4), wherein the at least one antenna (4) is arranged on a carrier device (5).

10 Claims, 2 Drawing Sheets

(51) Int. Cl.
*H01Q 1/22* (2006.01)
*B60C 15/04* (2006.01)

(58) Field of Classification Search
USPC ........................................................ 340/447
See application file for complete search history.

(56) References Cited

U.S. PATENT DOCUMENTS

| | | | | |
|---|---|---|---|---|
| 6,581,657 | B1* | 6/2003 | Brown | G06K 19/07764 |
| | | | | 152/526 |
| 7,017,405 | B2* | 3/2006 | Benedict | H01Q 1/2241 |
| | | | | 73/146.5 |
| 8,157,172 | B2 | 4/2012 | Fenkanyn | |
| 9,385,420 | B2 | 7/2016 | Tucker | |
| 10,339,435 | B2 | 7/2019 | Destraves | |
| 2003/0221766 | A1* | 12/2003 | Strache | B60C 23/0433 |
| | | | | 156/123 |
| 2004/0182494 | A1* | 9/2004 | Dominak | B60C 23/0493 |
| | | | | 156/110.1 |
| 2005/0133132 | A1* | 6/2005 | Girard | H01Q 1/2241 |
| | | | | 425/49 |
| 2007/0279202 | A1 | 12/2007 | Lionetti | |
| 2008/0257471 | A1 | 10/2008 | Cottin et al. | |
| 2010/0032066 | A1* | 2/2010 | Nakao | B60C 13/00 |
| | | | | 235/492 |
| 2010/0108211 | A1 | 5/2010 | Fenkanyn | |
| 2010/0123584 | A1 | 5/2010 | Lionetti et al. | |
| 2010/0212791 | A1* | 8/2010 | Incavo | B60C 23/0493 |
| | | | | 235/487 |
| 2011/0198402 | A1 | 8/2011 | Tucker | |
| 2012/0091209 | A1* | 4/2012 | Hotaling | B60C 23/0493 |
| | | | | 156/110.1 |
| 2012/0291936 | A1 | 11/2012 | Lionetti et al. | |
| 2018/0174015 | A1 | 6/2018 | Destraves | |

FOREIGN PATENT DOCUMENTS

| | | |
|---|---|---|
| DE | 10212880 A1 | 10/2003 |
| DE | 102004045262 A1 | 3/2006 |
| EP | 0746475 A1 | 12/1996 |
| EP | 2182576 A1 | 5/2010 |
| FR | 2966768 A1 | 5/2012 |
| WO | 2010015782 A2 | 2/2010 |
| WO | 2011100043 A1 | 8/2011 |
| WO | 2016193457 A1 | 12/2016 |

OTHER PUBLICATIONS

International Search Report dated Jan. 21, 2019 of PCT application PCT/EP2018/078137 on which this application is based.
Part of counterpart application CN office action dated Apr. 6, 2022 of application No. 2018800851679 (PCT/EP2018/078137).

* cited by examiner

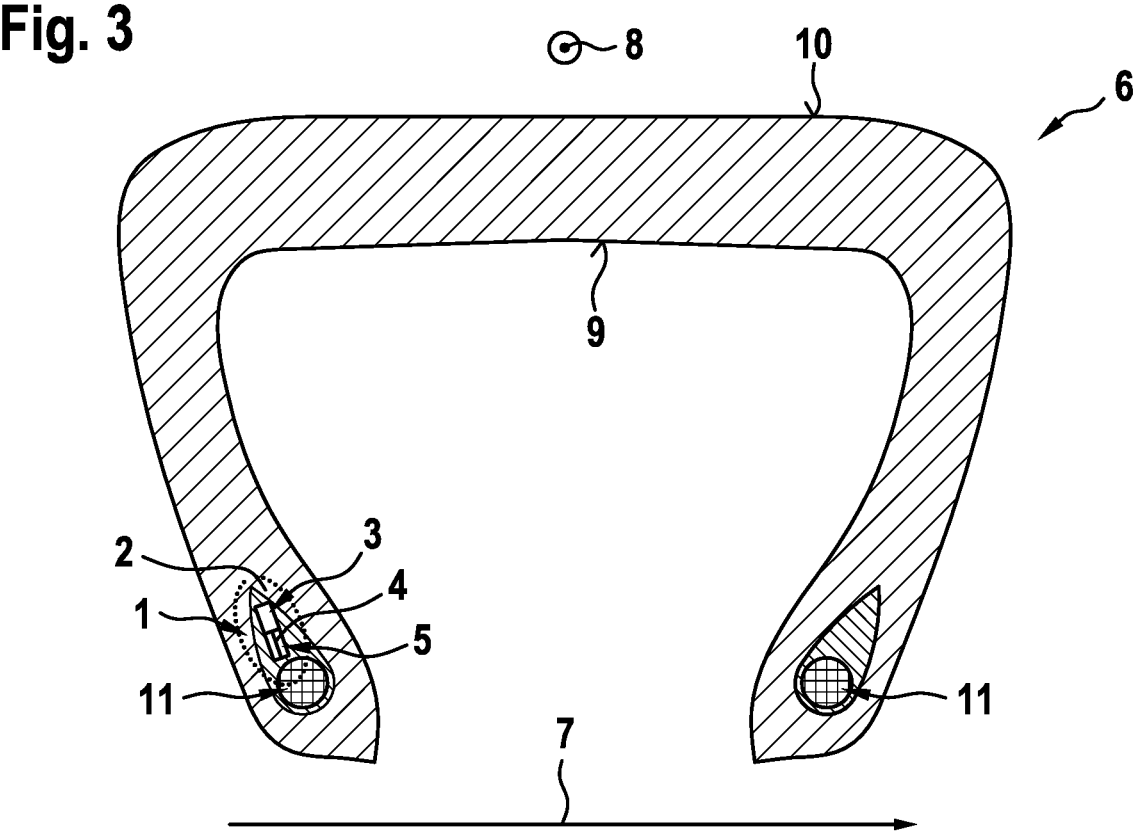
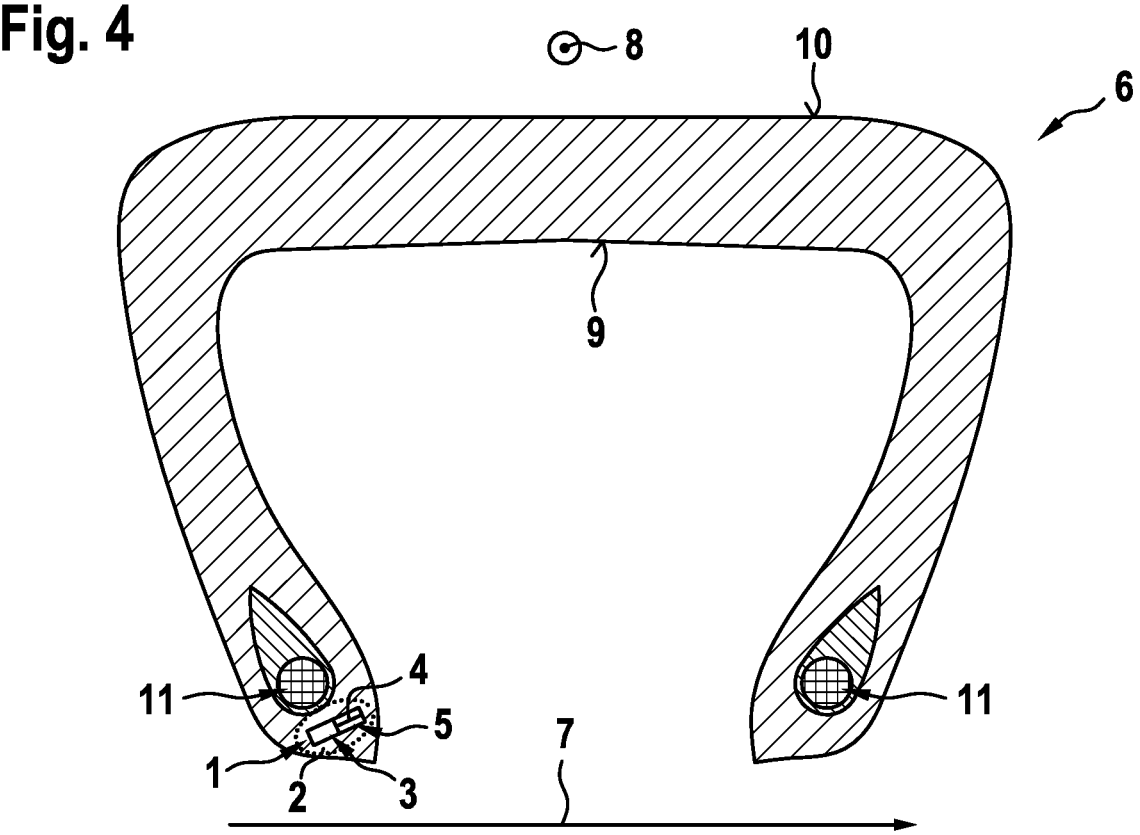

TIRE COMPONENT FOR A GREEN TIRE

Tire component for a green tire

The present invention relates to a tire.

The invention is based on a tire component for a green tire. A rubber region of the tire component is made of rubber. At least one transmitting and receiving device is arranged in the rubber region, the at least one transmitting and receiving device being an electromagnetically acting transmitting and receiving device. The at least one transmitting and receiving device has at least one antenna.

The rubber region of the tire component is such a region of the tire component that is largely made of rubber. In this case, the rubber has in particular a homogeneous rubber formation.

The rubber component is for example an extruded component.

The at least one transmitting and receiving device is for example an RFID device. RFID means radio frequency identification, that is to say identification by means of electromagnetic waves. The at least one transmitting and receiving device is suitable for storing information.

The information is in particular information about the tire component in which the at least one transmitting and receiving device is arranged and used.

Furthermore, the at least one transmitting and receiving device is suitable for passive or active reading by way of an external reader. The at least one transmitting and receiving device is preferably intended for receiving information and/or for sending information. The information is information about the tire in which the tire component in which the at least one transmitting and receiving device is arranged is used.

Tires are known from the prior art, the tires having electromagnetic transmitting and receiving devices. For example, DE 10 2004 045 262 A1 discloses a vehicle tire, the vehicle tire having a carcass and an integrated transponder. The integrated transponder is an electromagnetic transmitting and receiving device.

It is also known from the prior art to use electromagnetic transmitting and receiving devices in rubber environments.

For example, WO 2010/015782 A2 discloses the arrangement of an RFID device between two rubber layers of a rubber band.

In the applications of transmitting and receiving devices known from the prior art, a mechanical load on the electromagnetic transmitting and receiving device could occur during a tire building process or a process of heating the tire, for example during vulcanization, or during the operation of the tire. In particular, a load on the antenna of the transmitting and receiving device could occur. This mechanical load on the antenna could damage the antenna. This damage to the antenna could ultimately result in the transmitting and receiving device only functioning unreliably or not at all. Since the use of a tire component can be improved by means of the transmitting and receiving device, in the event of a defective transmitting and receiving device it could be that the use of the tire component is not at its optimum.

The invention is therefore based on the object of providing a tire component having an electromagnetic transmitting and receiving device, wherein the operation of the electromagnetic transmitting and receiving device is ensured even under high mechanical loading and improved use of the tire component is thereby made possible.

The object according to the invention is achieved by the at least one antenna being arranged on a carrier device.

The fact according to the invention that the at least one antenna is arranged on a carrier device means that the antenna of the transmitting and receiving device is largely protected from mechanical loads. The background of the protection is the properties of the carrier device, which reduces the probability of a physical load on the antenna occurring and a possible extent of this load. The carrier device supports the antenna.

Overall, reliable use of the antenna of the transmitting and receiving device, and thus the operation of the electromagnetic transmitting and receiving device itself in the tire component, are thus ensured.

Improved use of the tire component is thus made possible.

The invention also relates to a green tire, which is rotatable in a circumferential direction about an axis of rotation, having an inner tire surface and an outer tire surface. Starting from the axis of rotation, the outer tire surface lies radially further outward than the inner tire surface. The outer tire surface is oriented away from the green tire and the inner tire surface is oriented toward the axis of rotation. The green tire has a tire component according to the invention.

The axis of rotation is an axis of symmetry of the green tire. The green tire follows the shape of a circle. The axis of rotation lies at the center of this circle. The axis of rotation is perpendicular to the plane in which this circle lies.

The invention also relates to a tire that has been produced by vulcanizing a green tire according to the invention.

The tire according to the invention may be a car tire or a truck tire or a bicycle tire.

The invention also relates to a method for using an electromagnetically acting transmitting and receiving device in a tire component, comprising at least the steps of:

providing a tire component;

providing an electromagnetically acting transmitting and receiving device, wherein the transmitting and receiving device has at least one antenna and the at least one antenna is arranged on a carrier device;

introducing the electromagnetic transmitting and receiving device into a rubber region of the tire component.

The electromagnetically acting transmitting and receiving device provided in the context of the method according to the invention is such an electromagnetically acting transmitting and receiving device as is in particular also part of the tire component according to the invention.

Further advantageous embodiments of the present invention are the subject of the dependent claims.

According to a preferred embodiment of the invention, the carrier device is a fabric, in particular a glass fiber fabric, a nylon fabric, a polyamide fabric, a polyester fabric, a poly(p-phenylene terephthalamide) fabric and/or a cotton fabric, or is a film, the film being formed in particular from polyamide, polypropylene and/or polyethylene terephthalate.

The fact according to the invention that the carrier device is a fabric, in particular a glass fiber fabric, a nylon fabric, a polyamide fabric, a polyester fabric, a poly(p-phenylene terephthalamide) fabric and/or a cotton fabric, means that a connection, in particular a material-bonding connection, of the carrier device to a rubber material directly surrounding the carrier device is produced. It also involves little effort to produce. Furthermore, because of its chemical and physical properties, the fabric, in particular the glass fiber fabric, the nylon fabric, the polyamide fabric, the polyester fabric, the poly(p-phenylene terephthalamide) fabric and the cotton fabric, is resistant to forces such as those that can occur during regular operation of a pneumatic tire.

The fact according to the invention that the carrier device is a film, the film being formed in particular from polyamide, polypropylene and/or polyethylene terephthalate, means that a connection, in particular a material-bonding connection, of the carrier device to a rubber material directly surrounding the carrier device is produced. It also involves little effort to produce. Furthermore, because of its chemical and physical properties, the film, in particular the film which is formed from polyamide, polypropylene and/or polyethylene terephthalate, is resistant to forces such as those that can occur during regular operation of a pneumatic tire.

According to a preferred embodiment of the invention, the at least one antenna is a linear antenna or a non-linear antenna.

In particular, a non-linear antenna extends in a non-straight form away from the electromagnetic transmitting and receiving device and has in particular a wave shape or a meandering shape. An antenna that follows a wave shape or meandering shape can compensate for expansions of the rubber material surrounding the antenna in the direction of the wave direction or the meandering direction and follow these expansions. Use of this antenna is then largely ensured when these expansions of the rubber material occur.

The fact according to the invention that the at least one antenna is a linear antenna or a non-linear antenna means that types of antenna that reliably ensure transmission of electromagnetic waves from and to the electromagnetic transmitting and receiving device or from and to another transmitting and receiving unit are used.

According to a preferred embodiment of the invention, the rubber region is formed from a crude rubber and/or an elastomer.

The fact according to the invention that the rubber region is formed from a crude rubber and/or an elastomer means that a reliable connection, in particular a material-bonding connection, of the transmitting and receiving device to the rubber region can be ensured.

According to a preferred embodiment of the invention, the rubber region is a sidewall region, a rim-strip region or a core-profile region of the tire component.

A sidewall region is such a rubber region that is involved in forming the sidewall of the tire after the tire component has been installed in a tire.

A rim-strip region is such a rubber region that is involved in forming the rim strip of the tire after the tire component has been installed in a tire.

A core-profile region is such a rubber region that is involved in forming the core profile of the tire after the tire component has been installed in a tire.

The fact according to the invention that the rubber region is a sidewall region, a rim-strip region or a core-profile region of the tire component means that the electromagnetic transmitting and receiving device is integrated into such a region of a pneumatic tire in which the electromagnetic transmitting and receiving device is largely protected from mechanical loads. The electromagnetic transmitting and receiving device is then largely protected, in particular even when the pneumatic tire is used regularly and over a long time. Furthermore, the pneumatic tire is largely unaffected in its driving properties by this arrangement.

According to a preferred embodiment of the method according to the invention, after providing the electromagnetically acting transmitting and receiving device, the rubber region is cut open in such a way that a receiving opening is created within the rubber region and subsequently the electromagnetic transmitting and receiving device is arranged in the receiving opening.

The fact according to the invention that, after providing the electromagnetically acting transmitting and receiving device, the rubber region is cut open in such a way that a receiving opening is created within the rubber region and subsequently the electromagnetic transmitting and receiving device is arranged in the receiving opening means that the electromagnetic transmitting and receiving device can be positioned precisely on a tire component that has already been manufactured, and there is no change in the manufacturing process during a regularly provided manufacturing process of producing a tire component.

Alternatively, according to a preferred embodiment of the method according to the invention, the electromagnetic transmitting and receiving device is shot into the rubber region.

In addition, the electromagnetic transmitting and receiving device can be introduced into the rubber region by means of an injection device, for example a syringe.

The fact according to the invention that, after providing the electromagnetically acting transmitting and receiving device, the electromagnetically acting transmitting and receiving device is shot into the rubber region means that the rubber of a non-vulcanized pneumatic tire is hardly damaged. Furthermore, it involves little effort to automate the shooting-in operation.

According to a preferred embodiment of the method according to the invention, the tire component is vulcanized.

The fact according to the invention that the tire component is vulcanized means that the receiving opening created can be closed again. The fact that the receiving opening is closed again leads to reliable fastening of the transmitting and receiving device in the tire component.

According to a next preferred embodiment of the invention, the tire is a vulcanized pneumatic tire or a vulcanized solid tire.

Further features, advantages and details, to which the scope of the invention is not limited however, will now be described in more detail with reference to the drawings.

In the figures:

FIG. 3 shows a schematic representation of a green tire according to the invention of a further embodiment;

FIG. 4 shows a schematic representation of a green tire according to the invention of a further embodiment.

Figure 1:
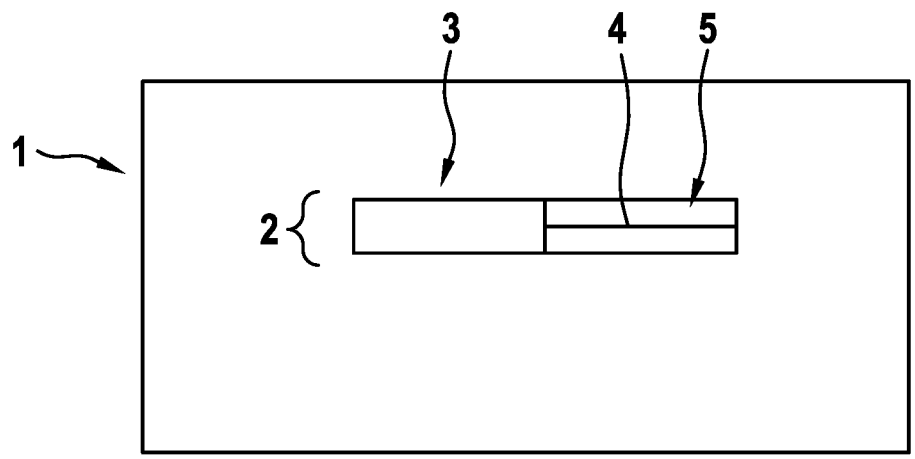
FIG. 1 shows a schematic representation of a tire component according to the invention.

In FIG. 1, a tire component 1 for a green tire is schematically represented.

A rubber region 2 of the tire component 1 is made of rubber, at least one transmitting and receiving device 3 being arranged in the rubber region 2, the at least one transmitting and receiving device 3 being an electromagnetically acting transmitting and receiving device 3 and the at least one transmitting and receiving device 3 having at least one antenna 4. The at least one antenna 4 is arranged on a carrier device 5.

Figure 2:
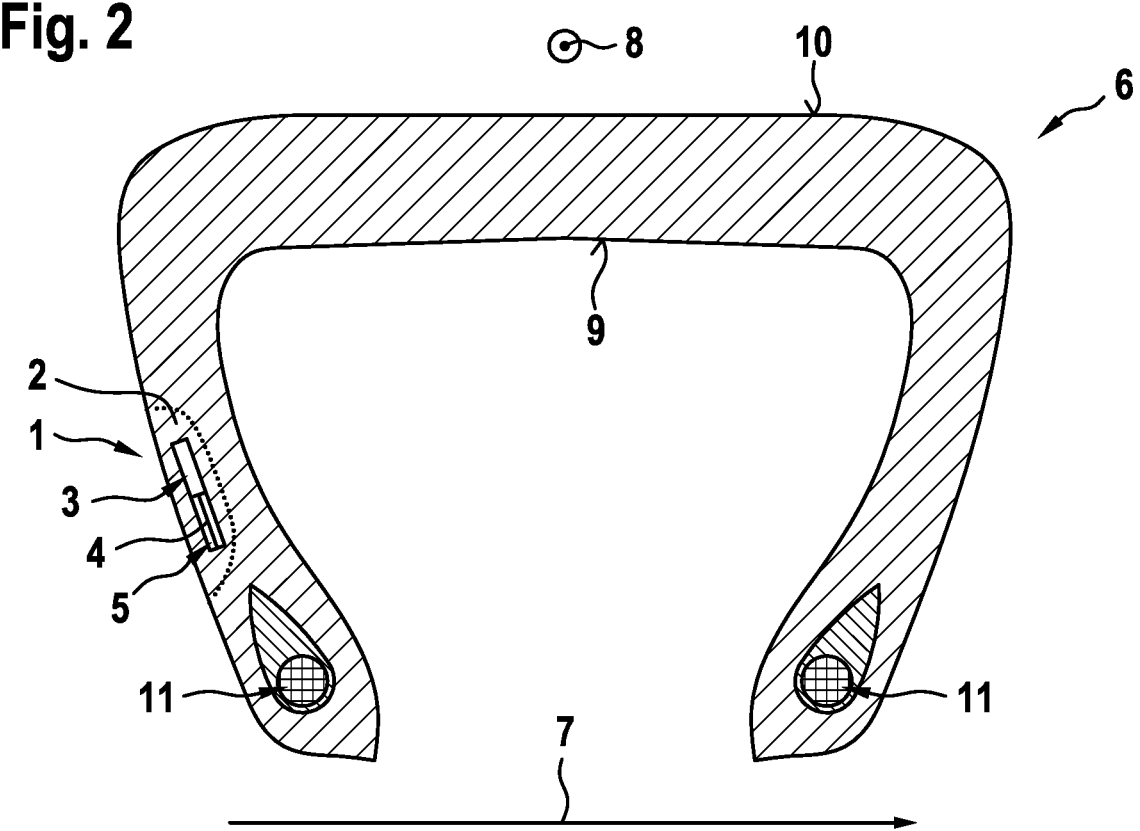
FIG. 2 shows a schematic representation of a green tire according to the invention.

In FIG. 2, a green tire 6 according to the invention is schematically represented in a radial sectional view. The green tire 6 can be rotated in the circumferential direction 8 about an axis of rotation 7. The green tire 6 has an inner tire surface 9 and an outer tire surface 10. Starting from the axis of rotation 7, the outer tire surface 10 lies radially further outward than the inner tire surface 9. The outer tire surface 10 is oriented away from the green tire 6. The inner tire surface 9 is oriented toward the axis of rotation 7.

A rubber region 2 of a tire component 1 of the green tire 6 is made of rubber. The tire component 1 is part of the green tire 6.

According to the representation in FIG. 2, the rubber region 2 is a sidewall region of the tire component 1.

The green tire has in particular a bead core 11.

In FIG. 3, a green tire 6 according to the invention as provided by a further embodiment is schematically represented in a radial sectional view. According to the representation in FIG. 3 and as a difference from the representation in FIG. 2, the rubber region 2 is a core-profile region of the tire component 1.

In FIG. 4, a green tire 6 according to the invention as provided by a further embodiment is schematically represented in a radial sectional view. According to the representation in FIG. 4 and as a difference from the representation in FIG. 2 or the representation in FIG. 3, the rubber region 2 is a rim-strip region of the tire component 1.

LIST OF REFERENCE SIGNS (Part of the Description)
- 1 Tire component
- 2 Rubber region
- 3 Transmitting and receiving device
- 4 Antenna
- 5 Carrier device
- 6 Green tire
- 7 Axis of rotation
- 8 Circumferential direction
- 9 Inner tire surface
- 10 Outer tire surface
- 11 Bead core

The invention claimed is:

1. A green tire rotatable in a circumferential direction about an axis of rotation comprising:
   an inner tire surface;
   an outer tire surface,
   wherein, starting from the axis of rotation, the outer tire surface lies radially further outward than the inner tire surface and the outer tire surface is oriented away from the green tire and the inner tire surface is oriented toward the axis of rotation;
   a receiving opening of a rubber region located in a rim strip region inner of a bead core of the green tire;
   a tire component comprising:
   a transmitting device and receiving device being arranged in the rubber region,
   the transmitting and receiving device being an electromagnetically acting transmitting and receiving device, and
   the transmitting and receiving device having at least one antenna, wherein the at least one antenna is arranged on a carrier device;
   the transmitting and receiving device arranged in the receiving opening.

2. The tire of claim 1, wherein the tire has been vulcanized.

3. A method for using an electromagnetically acting transmitting and receiving device in a tire component, the method comprising:
   providing a tire component;
   providing an electromagnetically acting transmitting and receiving device, wherein the transmitting and receiving device has at least one antenna and the at least one antenna is arranged on a carrier device;
   forming a receiving region in a tire under a bead core;
   introducing the electromagnetic transmitting and receiving device into the receiving region prior to vulcanization of the tire;
   vulcanizing the tire.

4. The method of claim 3, wherein, after providing the electromagnetically acting transmitting and receiving device and prior to the introducing the electromagnetic transmitting and receiving device,
   the rubber region is cut open to create the receiving opening within the rubber region and subsequently the electromagnetic transmitting and receiving device is arranged in the receiving opening, or
   the electromagnetic transmitting and receiving device is shot into the rubber region.

5. The method of claim 4, wherein the tire component and the tire are unvulcanized prior to vulcanizing.

6. The tire component of claim 1, wherein the carrier device is a fabric and includes a material bonding connection that connects with the rubber region.

7. The tire component of claim 6, wherein the carrier device is resistant to forces that occur during regular operation of a pneumatic tire.

8. The tire component of claim 7, wherein the at least one antenna is a non-linear antenna and extends from the at least one transmitting and receiving device and follows a meandering shape configured to compensate for expansion of surrounding rubber material.

9. The method of claim 3, wherein the carrier device for the at least one antenna is a fabric.

10. The method of claim 9, wherein the rubber region is of a green tire and comprised of rubber and the tire component is part of the green tire.

* * * * *